(12) United States Patent
Hirano et al.

(10) Patent No.: US 10,100,914 B2
(45) Date of Patent: Oct. 16, 2018

(54) GEAR

(71) Applicant: HONDA MOTOR CO., LTD., Tokyo (JP)

(72) Inventors: Yoshimi Hirano, Wako (JP); Ikuo Omori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 290 days.

(21) Appl. No.: 15/008,443

(22) Filed: Jan. 28, 2016

(65) Prior Publication Data

US 2016/0230871 A1    Aug. 11, 2016

(30) Foreign Application Priority Data

Feb. 9, 2015 (JP) .................................. 2015-023427

(51) Int. Cl.
| | |
|---|---|
| *F16H 55/14* | (2006.01) |
| *F16H 55/18* | (2006.01) |
| *F16F 15/12* | (2006.01) |

(52) U.S. Cl.
CPC ............. *F16H 55/14* (2013.01); *F16F 15/12* (2013.01); *F16H 55/18* (2013.01)

(58) Field of Classification Search
CPC ........... F16H 55/14; F16H 15/12; F16H 55/18
See application file for complete search history.

(56) References Cited

U.S. PATENT DOCUMENTS

| | | | | |
|---|---|---|---|---|
| 2,702,995 A | * | 3/1955 | Biedess | F16D 3/70 464/71 |
| 3,060,767 A | * | 10/1962 | Parrett | F16H 13/06 475/183 |
| 3,195,324 A | * | 7/1965 | Sellwood | F16D 3/68 464/74 |
| 3,257,860 A | * | 6/1966 | Runde | B62D 55/0963 464/75 |
| 3,304,795 A | * | 2/1967 | Rouverol | F16H 55/06 74/411 |
| 4,328,879 A | * | 5/1982 | Tone | B62M 9/00 180/219 |
| 6,393,929 B1 | * | 5/2002 | Quere | F16H 1/16 74/411 |
| 2011/0036189 A1 | * | 2/2011 | Hausseecker | F16H 55/14 74/411 |
| 2016/0138696 A1 | * | 5/2016 | Gielesberger | F16H 55/14 74/411 |

FOREIGN PATENT DOCUMENTS

JP           2004-052918          2/2004

* cited by examiner

*Primary Examiner* — David M Fenstermacher
(74) *Attorney, Agent, or Firm* — Mori & Ward, LLP (57) ABSTRACT

A gear includes a toothed portion, a boss, a first connector, a second connector, and a dynamic damper. The toothed portion is disposed at a radially outer side of the gear. The boss is disposed at a radially inner side of the gear. The first connector connects the toothed portion and the boss. The second connector connects the toothed portion and the boss. The second connector faces the first connector such that the toothed portion, the boss, the first connector, and the second connector define a sealed space. The dynamic damper is disposed in the sealed space.

20 Claims, 7 Drawing Sheets

GEAR

CROSS-REFERENCE TO RELATED APPLICATIONS

The present application claims priority under 35 U.S.C. § 119 to Japanese Patent Application No. 2015-023427, filed Feb. 9, 2015, entitled "Gear." The contents of this application are incorporated herein by reference in their entirety.

BACKGROUND

Field of the Invention

The present disclosure relates to a gear.

Discussion of the Background

Japanese Unexamined Patent Application Publication No. 2004-52918 discloses a gear including a boss supported by a rotation shaft, a connection plate detachably fixed to a radially outer portion of the boss with a bolt, and an annular toothed member (gear teeth) detachably fixed to a radially outer portion of the connection plate. If the toothed member becomes worn, only the toothed member needs to be detached from the connection plate for replacement. This allows quick and low cost replacement of the toothed member.

SUMMARY

According to one aspect of the present invention, a gear includes a toothed member at a radially outer side, a boss at a radially inner side, two connectors, and a dynamic damper. The two connectors connect the toothed member and the boss to each other such that such that the toothed member, the boss, the first connector, and the second connector define a sealed space. The dynamic damper is disposed in the sealed space.

According to another aspect of the present invention, a gear includes a toothed portion, a boss, a first connector, a second connector, and a dynamic damper. The toothed portion is disposed at a radially outer side of the gear. The boss is disposed at a radially inner side of the gear. The first connector connects the toothed portion and the boss. The second connector connects the toothed portion and the boss. The second connector faces the first connector such that the toothed portion, the boss, the first connector, and the second connector define a sealed space. The dynamic damper is disposed in the sealed space.

According to further aspect of the present invention, a gear includes a toothed portion, a boss, at least one connector and a dynamic damper. The toothed portion is disposed at a radially outer side of the gear. The boss is disposed at a radially inner side of the gear. The at least one connector connects the toothed portion and the boss to each other such that the toothed portion, the boss, and the at least one connector form a sealed space. The dynamic damper is disposed in the sealed space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
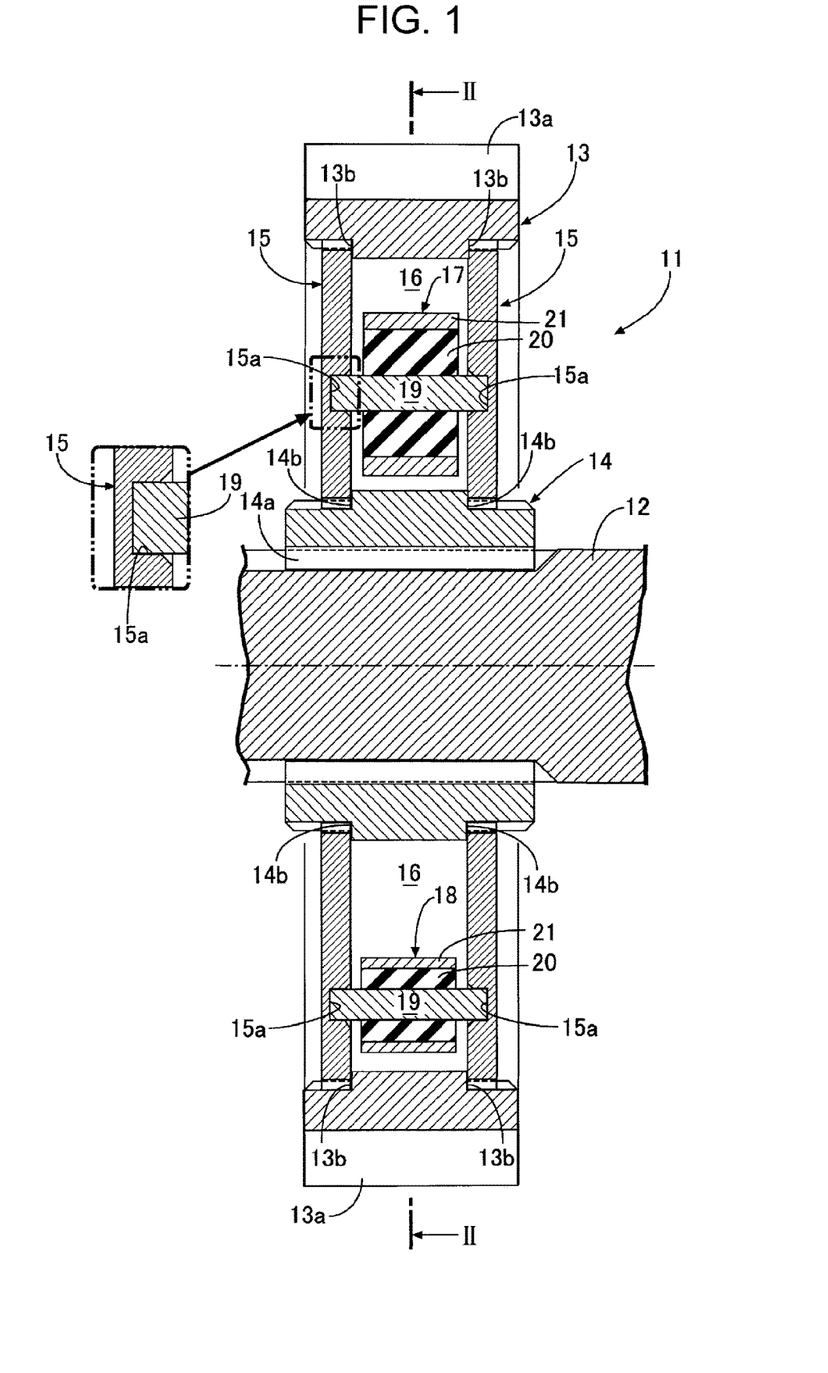
FIG. 1 is a vertical cross-sectional view of a gear taken along a line I-I in FIG. 2 (First Embodiment)
Figure 2:
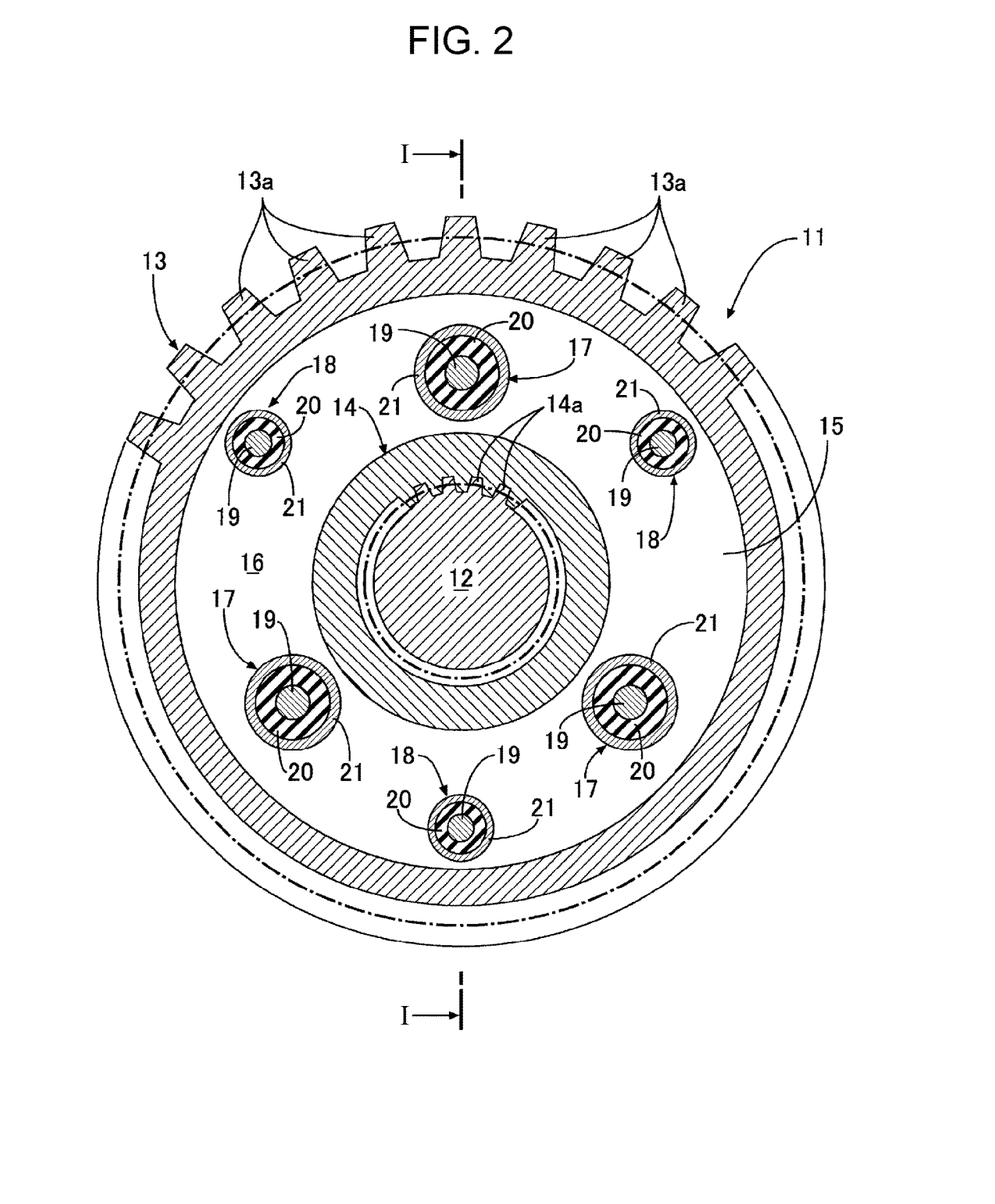
FIG. 2 is a cross-sectional view taken along a line II-II in FIG. 1 (First Embodiment)

A first embodiment of the present disclosure is described with reference to FIG. 1 and FIG. 2. A gear 11 used for transmission in an automobile, for example, includes an annular toothed member (toothed portion) 13 at a radially outer side, a boss 14 at a radially inner side, and two planar connectors 15. The planar connectors 15 connect the toothed member 13 and the boss 14 to each other. The annular toothed member 13 has a plurality of teeth 13a. The boss 14 has a spline 14a on the inner peripheral surface so as to be fixed to a rotation shaft 12. The toothed member 13 includes two steps 13b on the inner peripheral surface of the axial end portions. Radially outer end portions of the connectors 15 are fixed to the corresponding steps 13b by press fitting. The toothed member 13 and the connectors 15 may have splines at a press fitting section, where the toothed member 13 and the connector 15 are fitted to each other, to improve the connection strength at the press fitting section and improve the sealing properties.

The boss 14 also has two steps 14b on the outer peripheral surface of the axial end portions. Radially inner end portions of the connectors 15 are fixed to the corresponding steps 14b by press fitting. The boss 14 and the connectors 15 may have splines at a press fitting section, where the boss 14 and the connector 15 are fitted to each other, to improve the connection strength at the press fitting section and improve the sealing properties. The gear 11 having the above-described configuration includes a sealed space 16, which is defined by the toothed member 13, the boss 14, and the two connectors 15.

Three first dynamic dampers 17 and three second dynamic dampers 18 are disposed in the sealed space 16 in the gear 11. The first dynamic dampers 17, which have the same configuration, each include a shaft 19, an elastic member 20, such as an annular rubber, fixed to an outer peripheral surface of the shaft 19, and an annular solid member 21 fixed to an outer peripheral surface of the elastic member 20. The shaft 19 has ends inserted into support holes 15a in opposing inner surfaces of the connectors 15. Thus, the first dynamic dampers 17 are held in a predetermined position in the sealed space 16. As illustrated in a magnified view, which is encircled by a dot-dashed line in FIG. 1, the support holes 15a each have a chamfered opening edge that allows the shaft 19 to be readily press-fitted into the support hole 15a.

The second dynamic dampers 18, which have a configuration substantially identical to that of the first dynamic dampers 17, differ from the first dynamic dampers 17 in dimensions of the elastic member 20 and the solid member 21. Thus, the second dynamic dampers 18 and the first dynamic, dampers 17 absorb vibrations at different vibration frequencies. The first dynamic dampers 17 and the second dynamic dampers 18 are alternately arranged in the sealed space 16 at intervals of 60 degrees.

In the gear 11 of the first embodiment having the above-described configuration, the toothed member 13, which is positioned at the radially outer side, is connected to the boss 14, which is positioned at the radially inner side, through the two connectors 15. The gear 11 having the above-described configuration has a hollow structure and has a lighter weight. In addition, in this configuration, the first dynamic dampers 17 and the second dynamic dampers 18 are disposed in the sealed space 16, which is defined by the toothed member 13, the boss 14, and the connectors 15. The sealed space 16 in the gear 11 is used as a housing for the first dynamic dampers 17 and the second dynamic dampers 18. Thus, the gear 11 has a smaller size. In addition, when the gear 11 is used in the presence of oil, the oil is prevented from entering the sealed space 16. This reduces the deterioration of the elastic members 20 of the first dynamic dampers 17 and the second dynamic dampers 18, which do not have resistance to oil.

The connectors 15 have the splines at the radially outer end portion and the radially inner end portion, and the toothed member 13 and the boss 14 each have the spline at the section to which the connectors 15 are press-fitted. Thus, the connectors 15, the toothed member 13, and the boss 14 are strongly connected at the press-fitting sections. This improves the strength of the gear 11 and improves the sealing properties of the sealed space 16.

The gear 11 may be vibrated due to a change in the rotational speed of the engine or due to switching of power transmission channels of a transmitter. In such a case, the first dynamic dampers 17 and the second dynamic dampers 18, which are disposed in the sealed space 16, exhibit damping characteristics and reduce the vibration of the gear 11. The elastic member 20 and the solid member 21 of the first dynamic damper 17 have different dimensions, for example, from those of the second dynamic damper 18 so as to absorb vibrations at different frequencies. This configuration further effectively reduces the vibration of the gear 11. The degree of damping is readily controlled by changing the number of the first dynamic dampers 17 and the second dynamic dampers 18.

In addition, the shaft 19 of each of the first dynamic dampers 17 and each of the second dynamic dampers 18 has the ends fixed in the support holes 15a in the opposing inner surfaces of the connectors 15 by press fitting. This configuration enables easy attachment of the first dynamic dampers 17 and the second dynamic dampers 18 without a separate fixing member. In addition, this configuration provides a greater degree of flexibility in positioning of the first and second dynamic dampers 17 and 18, respectively, and enables effective use of the sealed space 16.

Second Embodiment

Figure 3:
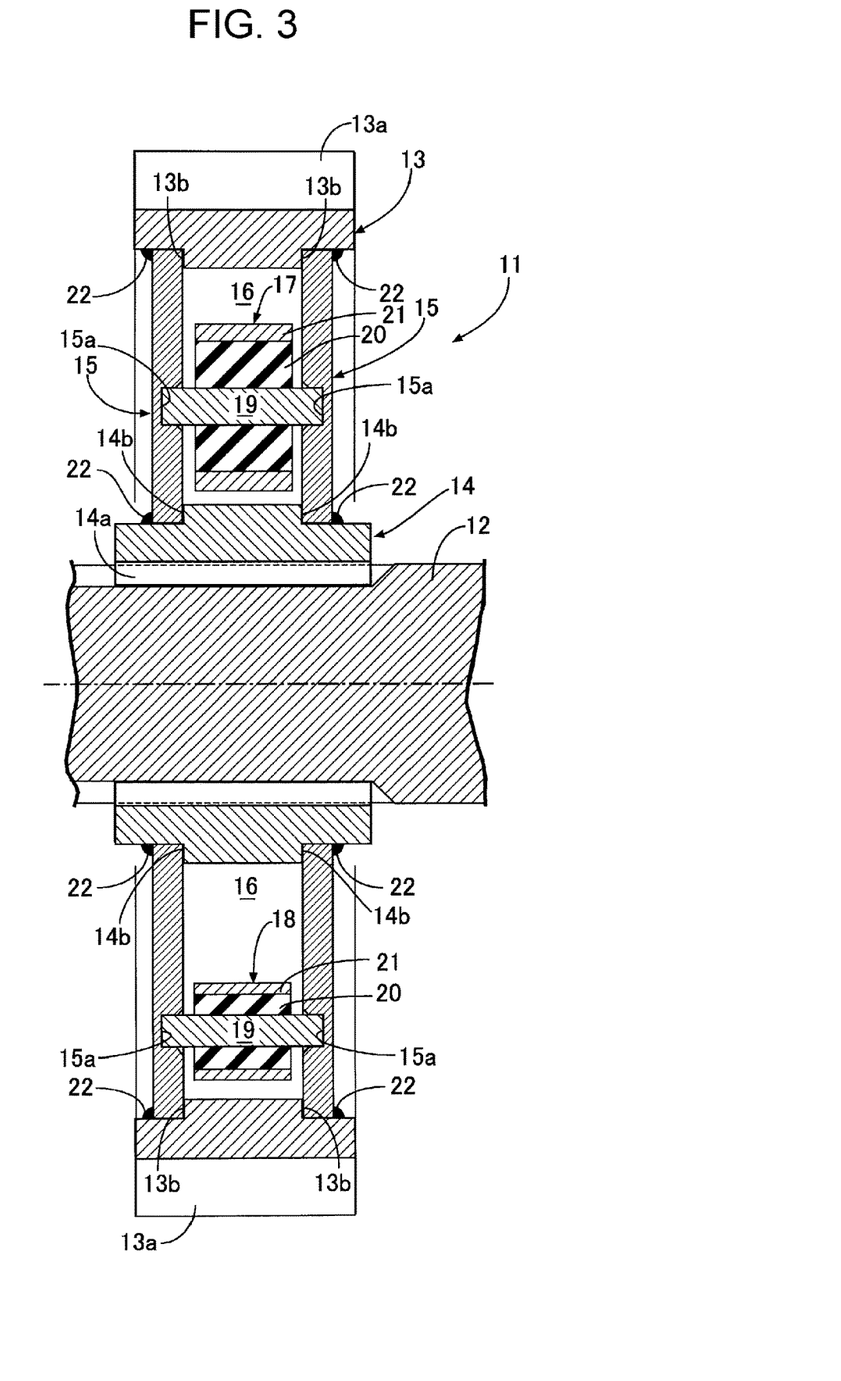
FIG. 3 is a vertical cross-sectional view corresponding to FIG. 1 (Second Embodiment)

A second embodiment of the present disclosure is described with reference to FIG. 3. In the first embodiment, the radially outer end portions of the connectors 15 are press-fitted to the steps 13b of the toothed member 13 through the splines, and the radially inner end portions of the connectors 15 are press-fitted to the steps 14b of the boss 14 through the splines. However, in the second embodiment, the press fitting sections between the radially outer circular end portions of the connectors 15 and the circular steps 13b of the toothed member 13 are fixed by welds 22, and the press fitting sections between the radially inner circular end portions of the connectors 15 and the circular steps 14b of the boss 14 are fixed by welds 22.

In the second embodiment, the toothed member 13, the boss 14, and the connectors 15 are strongly connected as in the first embodiment. Thus, the gear 11 of the second embodiment has higher strength and secures the sealing properties of the sealed space 16.

Third Embodiment

Figure 4:
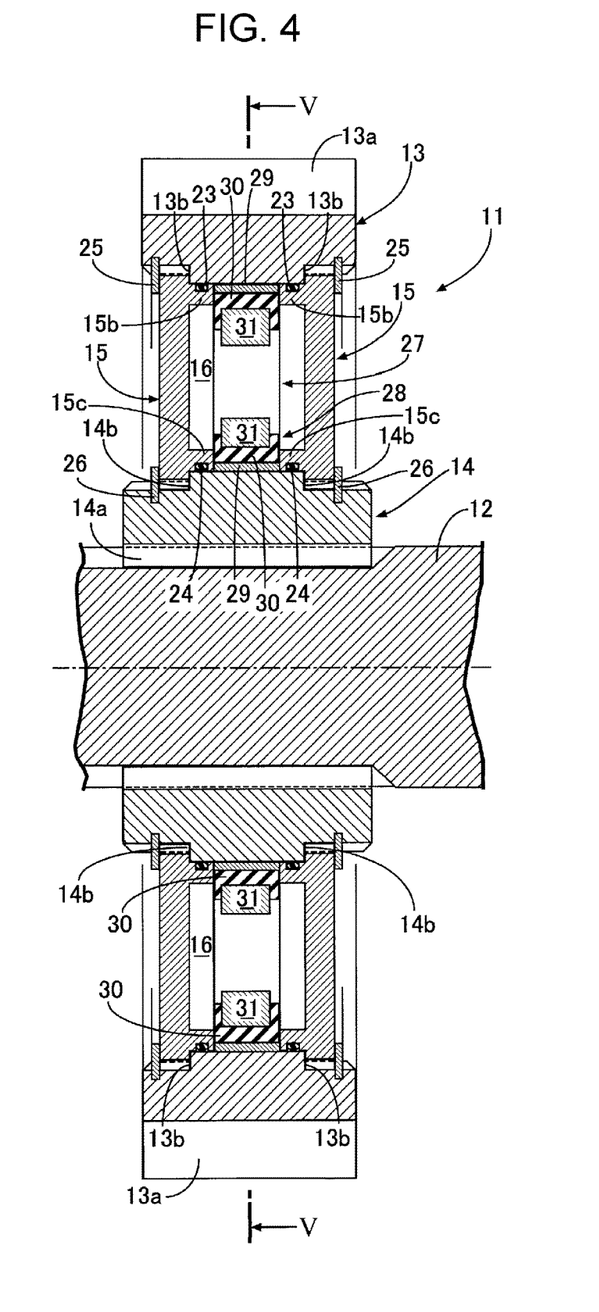
FIG. 4 is a vertical cross-sectional view taken along a line IV-IV in FIG. 5 and corresponds to FIG. 1 (Second Embodiment)
Figure 5:
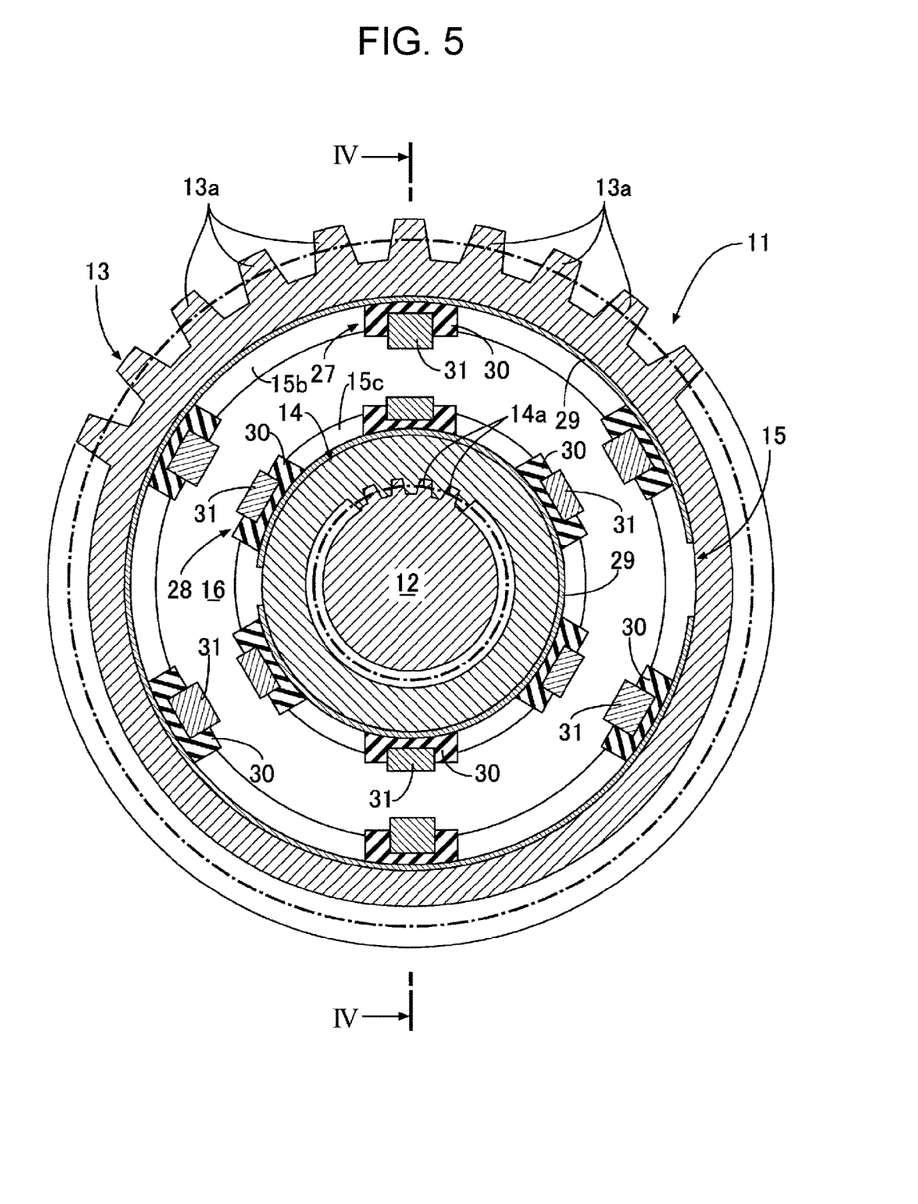
FIG. 5 is a cross-sectional view taken along a line V-V in FIG. 4 (Third Embodiment)

A third embodiment of the present disclosure is described with reference to FIG. 4 and FIG. 5. The gears 11 in the first and second embodiments include the toothed member 13, the boss 14, and the two connectors 15 in a non-detachable manner. However, the gear 11 in the third embodiment includes the toothed member 13, the boss 14, and the connectors 15 in a detachable manner.

Specifically, the connector 15 includes an annular outer protrusion 15b and an annular inner protrusion 15c on the inner surface. An O-ring 23 is disposed on an outer peripheral surface of the outer protrusion 15b so as to be in contact with an inner peripheral surface of the toothed member 13. An O-ring 24 is disposed on an inner peripheral surface of the inner protrusion 15c so as to be in contact with an outer peripheral surface of the boss 14. The radially outer portion of the connector 15 is fastened to the inner peripheral surface of the toothed member 13 with a circlip 25 so as not to be disconnected. The radially inner portion of the connector 15 is fastened to the outer peripheral surface of the boss 14 with a circlip 26 so as not to be disconnected.

A first dynamic damper 27 disposed in the sealed space 16 in the gear 11 includes a support member 29 including a metal leaf spring having a split ring shape, six elastic members 30 fixed to an inner peripheral surface of the support member 29 at regular intervals in a circumferential direction, and solid members 31 each fixed to an inner peripheral surface of the elastic member 30. To attach the first dynamic damper 27 to the toothed member 13, the support member 29 elastically deformed so as to have a reduced diameter is placed on the inner peripheral surface of the toothed member 13 before the toothed member 13 is mounted. Then, the compression force on the support member 29 is released. As a result, the support member 29 expands due to its elastic force and comes in close contact with the inner peripheral surface of the toothed member 13, and thus the first dynamic damper 27 is fixed to the toothed member 13.

The second dynamic damper 28 disposed in the sealed space 16 in the gear 11 includes a support member 29 including a metal leaf spring having a split ring shape, six elastic members 30 fixed to an outer peripheral surface of the support member 29 at regular intervals in the circumferential direction, and a solid member 31 each fixed to an outer peripheral surface of the elastic member 30. To attach the second dynamic damper 28 to the boss 14, the support member 29 elastically deformed so as to have an enlarged diameter is placed on the outer peripheral surface of the boss 14 before the boss 14 is mounted. Then, the tension force on the support member 29 is released. As a result, the support member 29 shrinks due to its elastic force and comes in close contact with the outer peripheral surface of the boss 14, and thus the second dynamic damper 28 is fixed to the boss 14.

The first dynamic damper 27 and the second dynamic damper 28 are attached to the toothed member 13 and the boss 14, respectively, as described above. Then, two connectors 15 are attached to the toothed member 13 and the boss 14. The gear 11 is assembled in this way.

In the configuration of this embodiment, the gear 11 has a lighter weight since the gear 11 has a hollow structure. In addition, connection sections between the toothed member 13 and the connectors 15 are sealed by the O-rings 23 and connection sections between the boss 14 and the connectors 15 are sealed by the O-rings 24. This configuration prevents oil from entering the sealed space 16, leading to a reduction in the deterioration of the elastic members 30. Additionally, this configuration allows easy maintenance or easy replacement of the first and second dynamic dampers 27 and 28, since the toothed member 13, the boss 14, the connector 15, the first dynamic dampers 27, and the second dynamic dampers 28 are readily detached by unfastening the circlips 25 and 26. In addition, this configuration requires replacement of only the toothed member 24 when the toothed member 13 of the gear 11 is worn or damaged. Thus, the repair cost is reduced.

Various kinds of the first dynamic dampers 27 and the second dynamic dampers 28 may be prepared for various damping frequencies. Any combination of dynamic dampers may be mounted for target frequencies. This enables the dynamic dampers to exhibit effective damping characteristics for vibrations at different frequencies.

Fourth Embodiment

Figure 6:
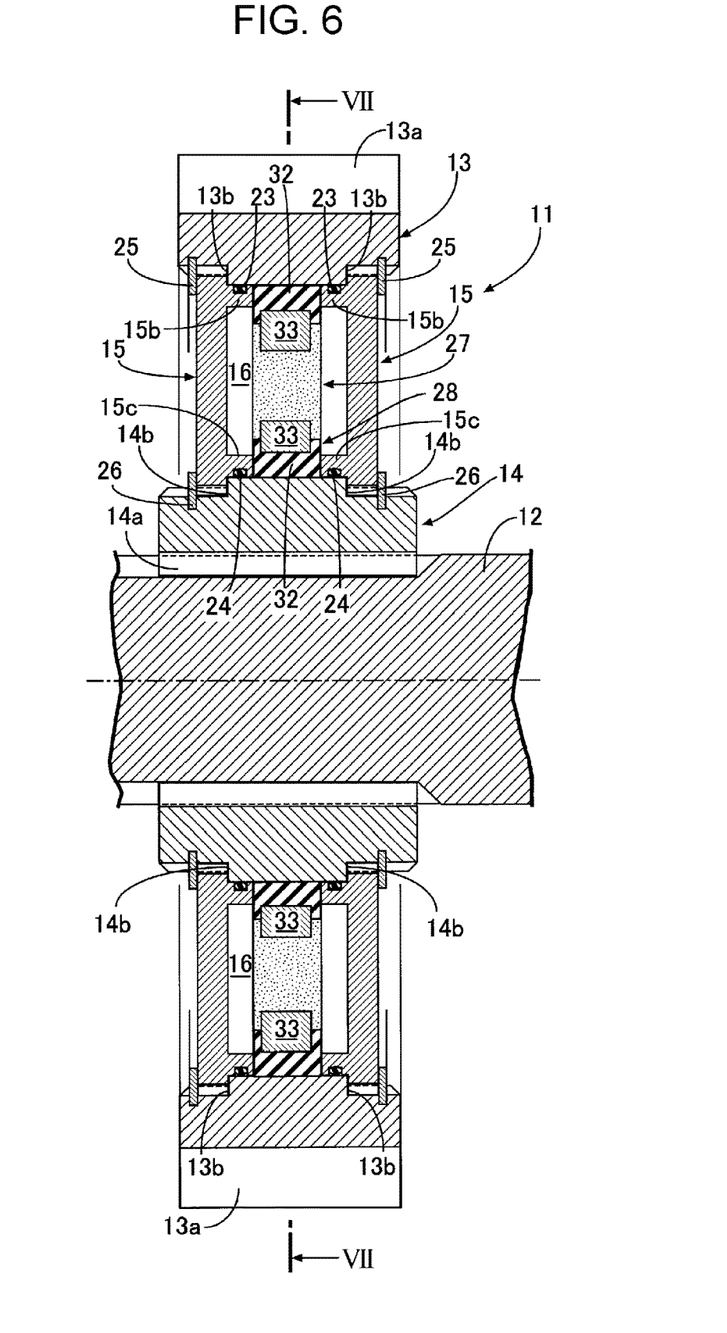
FIG. 6 is a vertical cross-sectional view taken along a line VI-VI in FIG. 7 and corresponds to FIG. 1 (Fourth Embodiment)
Figure 7:
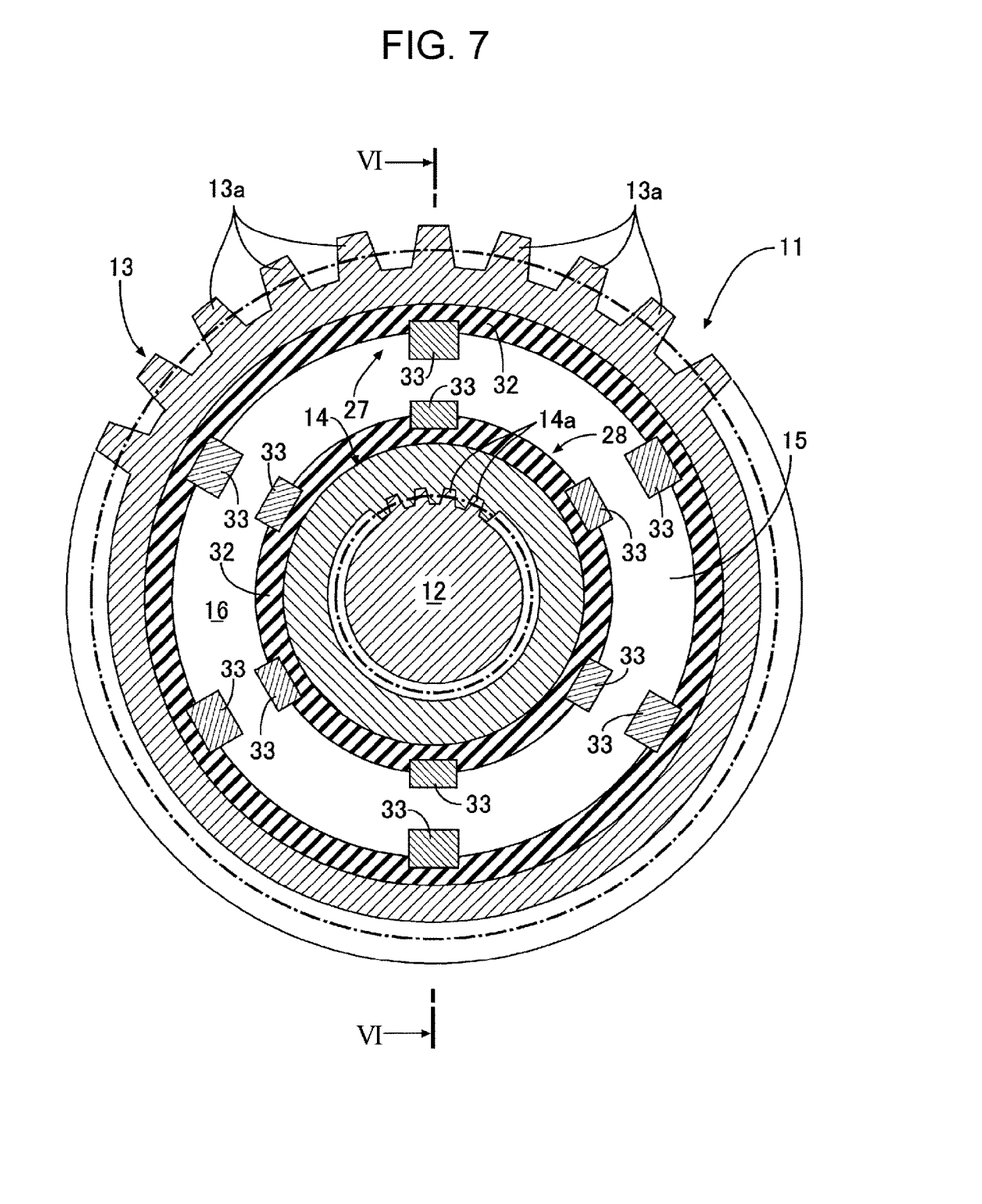
FIG. 7 is a cross-sectional view taken along a line VII-VII in FIG. 6 (Fourth Embodiment).

A fourth embodiment of the present disclosure is described with reference to FIG. 6 and FIG. 7. The fourth embodiment differs from the third embodiment only in the configuration of each of the first dynamic damper 27 and the second dynamic damper 28.

Specifically, the first dynamic damper 27 of the fourth embodiment includes an annular elastic member 32, and six solid members 33 fixed to an inner peripheral surface of the elastic member 32 at regular intervals in the circumferential direction. The outer peripheral surface of the elastic member 32 is bonded to the inner peripheral surface of the toothed member 13. The second dynamic damper 28 includes an annular elastic member 32 and six solid members 33 fixed to the outer peripheral surface of the elastic member 32 at regular intervals in the circumferential direction. The inner peripheral surface of the elastic member 32 is bonded to the outer peripheral surface of the boss 14.

With this configuration, the number of components in this configuration is smaller than that in the third embodiment, since only one elastic member 32 is provided for the six solid members 33 and the elastic members 32 are directly fixed to the toothed member 13 and the boss 14.

The embodiments of the present disclosure are described above, but various modifications may be added without departing from the gist of the present disclosure.

The gears 11 of the embodiments include two types of dynamic dampers, i.e., the first dynamic damper 17 or 27 and the second dynamic damper 18 or 28, but may include one type of dynamic damper or three or more types of dynamic dampers, for example.

The gears 11 of the embodiments are supported by the shaft 12 in a non-rotatable manner relative to each other, but may be supported by the shaft 12 in a rotatable manner relative to each other.

In embodiments described above, first dynamic dampers 17 and 27 and second dynamic dampers 18 and 28 each correspond to the dynamic damper of the present disclosure, O-rings 23 and 24 each correspond to the sealing member of the present disclosure, and circlips 25 and 26 each correspond to the fastener of the present disclosure.

According to one aspect of the disclosure, a gear includes a toothed member at a radially outer side, a boss at a radially inner side, two connectors, and a dynamic damper. The connectors connect the toothed member and the boss to each other such that the toothed member, the boss, and the connectors define a sealed space. The dynamic damper is disposed in the sealed space.

The gear having the above-described configuration has a lighter weight since the gear has a hollow structure and has a smaller size since the dynamic damper is disposed inside the gear. In addition, the dynamic damper is unlikely to deteriorate since oil is prevented from entering the sealed space in the gear.

According to a second aspect, in the gear having the configuration of the first aspect, radially outer end portions of the connectors are fixed to the toothed member by press fitting, and radially inner end portions of the connectors are fixed to the boss by press fitting.

With this configuration, sealing properties of the sealed space are readily secured. In addition, with this configuration, the toothed member, the boss, and the connectors are strongly connected. Thus, the strength of the gear is improved.

According to a third aspect, the gear having the configuration of the first aspect further includes sealing members and fasteners. Radially outer end portions of the connectors are each fitted to the toothed member, with the sealing member being disposed therebetween, and fastened thereto with the fastener. Radially inner end portions of the connectors are each fitted to the boss, with the sealing member being disposed therebetween, and fastened thereto with the fastener.

With this configuration, sealing properties of the sealed space are readily secured. In addition, with this configuration, the toothed member, the boss, and the connectors are detachable, allowing easy replacement and maintenance of the dynamic damper and easy replacement of a worn or damaged component. Thus, repair cost of the gear is reduced.

According to a fourth aspect, in the gear having the configuration according to any one of the first to third aspects, the dynamic damper includes a shaft, an annular elastic member disposed on an outer peripheral surface of the shaft, and an annular solid member disposed on an outer peripheral surface of the elastic member. The shaft has ends fixed in support holes in opposing surfaces of the connectors.

With this configuration, the dynamic damper is readily mounted without a separate fixing member. In addition, this configuration provides a greater degree of flexibility in positioning of the dynamic damper and enables effective use of the sealed space.

According to a fifth aspect, in the gear having the configuration according to any one of the first to third aspects, the dynamic damper includes an elastic member and a solid member. The elastic member is disposed on at least one of an inner peripheral surface of the toothed member and an outer peripheral surface of the boss. The solid member is disposed on the elastic member.

In this configuration, the connectors are attached to the toothed member and the boss after the dynamic damper is attached to at least one of the toothed member and the boss. Thus, the assembling of the gear is easy. In addition, if the dynamic dampers are attached to both the toothed member and the boss, the dynamic dampers absorb vibrations at different input frequencies.

Obviously, numerous modifications and variations of the present invention are possible in light of the above teachings. It is therefore to be understood that within the scope of the appended claims, the invention may be practiced otherwise than as specifically described herein.

What is claimed is:

1. A gear comprising:
a toothed member at a radially outer side;
a boss at a radially inner side;
two connectors connecting the toothed member and the boss to each other such that the toothed member, the boss, and the connectors define a sealed space, the two connectors being fixed to the toothed member and the boss; and
a dynamic damper disposed in the sealed space.

2. The gear according to claim 1, wherein
radially outer end portions of the connectors are fixed to the toothed member by press fitting, and
radially inner end portions of connectors are fixed to the boss by press fitting.

3. The gear according to claim 1, further comprising:
sealing members; and
fasteners including a first fastener and a second fastener, wherein
radially outer end portions of the connectors are each fitted to the toothed member, with the sealing member being disposed therebetween, and fastened thereto with the first fastener, and
radially inner end portions of the connectors are each fitted to the boss, with the sealing member being disposed therebetween, and fastened thereto with the second fastener.

4. The gear according to claim 1,
wherein the dynamic damper includes:
a shaft;
an annular elastic member disposed on an outer peripheral surface of the shaft; and
an annular solid member disposed on an outer peripheral surface of the elastic member, and
the shaft has ends fixed in support holes in opposing surfaces of the connectors.

5. The gear according to claim 1, wherein the dynamic damper includes:
an elastic member disposed on at least one of an inner peripheral surface of the toothed member and an outer peripheral surface of the boss via a support member or a bonding member, the support member having an annular shape with a center axis that coincides with a rotation axis of the toothed member; and
a solid member disposed on the elastic member.

6. The gear according to claim 1, wherein the sealed space defined by the toothed member, the boss, and the connectors is an empty void within the gear.

7. The gear according to claim 1, wherein
the two connectors each have an inner peripheral surface and an outer peripheral surface,
the inner peripheral surface of each of the two connectors directly contacting the boss, and
the outer peripheral surface of each of the two connectors directly contacting the toothed member.

8. The gear according to claim 1, wherein
the boss includes two steps on an outer peripheral surface thereof,
the toothed member includes two steps on an inner peripheral surface thereof,
the two steps on the boss respectively receiving the inner peripheral surface of each of the two connectors, and
the two steps on the toothed member respectively receiving the outer peripheral surface of each of the two connectors.

9. The gear according to claim 1, wherein the boss is configured to be supported by and in direct contact with a rotation shaft, the boss and the toothed member being configured to be rotatable with rotation of the rotation shaft such that the toothed member does not rotate relative to the boss.

10. A gear comprising:
a toothed portion disposed at a radially outer side of the gear;
a boss disposed at a radially inner side of the gear;
a first connector connecting the toothed portion and the boss, the first connector being fixed to the toothed portion and the boss;
a second connector connecting the toothed portion and the boss, the second connector being fixed to the toothed portion and the boss, the second connector facing the first connector such that the toothed portion, the boss, the first connector, and the second connector define a sealed space; and
a dynamic damper disposed in the sealed space.

11. The gear according to claim 10, wherein the first connector and the second connector are connected to the toothed portion and the boss by press fitting.

12. The gear according to claim 10, further comprising:
a first sealing member contacting the toothed portion and the first connector;
a second sealing member contacting the first connector and the boss;
a first fastener configured to fasten the first connector on the toothed portion; and
a second fastener configured to fasten the first connector on the boss.

13. The gear according to claim 12, further comprising:
a third sealing member contacting the toothed portion and the second connector;
a fourth sealing member contacting the second connector and the boss;
a third fastener configured to fasten the second connector on the toothed portion; and
a fourth fastener configured to fasten the second connector on the boss.

14. The gear according to claim 10,
wherein the dynamic damper includes:
a shaft having a first end;
an annular elastic member disposed on an outer peripheral surface of the shaft; and
an annular solid member disposed on an outer peripheral surface of the elastic member, and
the first connector has a first support hole in a first surface of the first connector, the first end of the shaft is connected into the first support hole.

15. The gear according to claim 14, wherein
the shaft further has a second end,
the second connector has a second support hole in a second surface of the second connector, the second surface facing the first surface and
the second end of the shaft is connected into the second support hole.

16. The gear according to claim 10, wherein the dynamic damper includes:
   a first elastic member disposed on an inner peripheral surface of the toothed portion via a first support member or a first bonding member, the first support member having an annular shape with a center axis that coincides with a rotation axis of the toothed portion; and
   a first solid member disposed on the first elastic member.

17. The gear according to claim 16, wherein the dynamic damper further includes:
   a second elastic member disposed on an outer peripheral surface of the boss via a second support member or a second bonding member, the second support member having an annular shape with a center axis that coincides with the rotation axis of the toothed member; and
   a second solid member disposed on the second elastic member.

18. The gear according to claim 10, wherein the dynamic damper includes an elastic member that extends continuously about an entire circumference of the gear.

19. The gear according to claim 10, wherein the sealed space defined by the toothed portion, the boss, the first connector, and the second connector is an empty void within the gear.

20. A gear comprising:
   a toothed portion disposed at a radially outer side of the gear;
   a boss disposed at a radially inner side of the gear;
   at least one connector connecting the toothed portion and the boss such that the toothed portion, the boss, and the at least one connector define a sealed space, the at least one connector being fixed to the toothed portion and the boss; and
   a dynamic damper disposed in the sealed space.

* * * * *